(12) United States Patent
Wu

(10) Patent No.: US 8,854,419 B2
(45) Date of Patent: Oct. 7, 2014

(54) METHOD AND SYSTEM FOR CONTROLLING MULTIPOINT VIDEO CONFERENCE, CENTRAL CONTROL SUBSYSTEM AND VIDEO TERMINAL

(75) Inventor: Yanping Wu, Shenzhen (CN)

(73) Assignee: ZTE Corporation, Shenzhen, Guangdong Provine (CN)

( * ) Notice: Subject to any disclaimer, the term of this patent is extended or adjusted under 35 U.S.C. 154(b) by 309 days.

(21) Appl. No.: 13/498,379

(22) PCT Filed: Jun. 13, 2010

(86) PCT No.: PCT/CN2010/073968
§ 371 (c)(1),
(2), (4) Date: Apr. 25, 2012

(87) PCT Pub. No.: WO2011/035613
PCT Pub. Date: Mar. 31, 2011

(65) Prior Publication Data
US 2012/0200662 A1    Aug. 9, 2012

(30) Foreign Application Priority Data
Sep. 27, 2009    (CN) .......................... 2009 1 0173980

(51) Int. Cl.
*H04N 7/15* (2006.01)
*H04L 12/18* (2006.01)

(52) U.S. Cl.
CPC .............. *H04N 7/15* (2013.01); *H04L 12/1818* (2013.01); *H04L 12/1813* (2013.01)
USPC .................. 348/14.09; 348/14.03; 348/14.07; 348/143; 370/261; 370/352; 370/469; 379/202.01; 709/204; 725/78

(58) Field of Classification Search
CPC ........... H04N 7/15; H04N 7/152; H04M 3/56; H04M 3/567
USPC ......... 348/14.03, 14.07, 14.09, 143; 370/261, 370/352, 469; 379/202.01; 709/204; 725/78
See application file for complete search history.

(56) References Cited

U.S. PATENT DOCUMENTS 4,479,195 A * 10/1984 Herr et al. ...................... 709/204
4,509,167 A *  4/1985 Bantel et al. .................. 370/261
(Continued)

FOREIGN PATENT DOCUMENTS

| CN | 1893628 A | 1/2007 |
| CN | 101094381 A | 12/2007 |

(Continued)

OTHER PUBLICATIONS

International Search Report for PCT/CN2010/073968 dated Aug. 25, 2010.

*Primary Examiner* — Gerald Gauthier
(74) *Attorney, Agent, or Firm* — Ling Wu; Stephen Yang; Ling and Yang Intellectual Property

(57) ABSTRACT

A system and method for controlling multipoint video conference, a video terminal and a central control subsystem are provided by the present invention. The system includes a central control subsystem and a video terminal at the conference place side, and central office equipment at the network side. The central control subsystem is configured to transmit a multipoint video conference control command to the video terminal; the video terminal is configured to transmit the received multipoint video conference control command to the central office equipment at the network side; the central office equipment is configured to control the video terminal of each conference place according to the received multipoint video conference control command. The scheme of the present invention maintains the good usability of the central control subsystem and guarantees the safety and the stability of the central office system.

15 Claims, 1 Drawing Sheet

(56) References Cited

U.S. PATENT DOCUMENTS

| | | | |
|---|---|---|---|
| 5,530,472 A * | 6/1996 | Bregman et al. | 348/14.09 |
| 7,339,605 B2 * | 3/2008 | Rodman et al. | 348/14.07 |
| 7,742,588 B2 * | 6/2010 | Rodman et al. | 379/202.01 |
| 7,787,605 B2 * | 8/2010 | Rodman | 379/202.01 |
| 7,822,065 B2 * | 10/2010 | Lu | 370/469 |
| 7,864,938 B2 * | 1/2011 | Rodman et al. | 379/202.01 |
| 7,884,843 B2 * | 2/2011 | Eshkoli et al. | 348/14.07 |
| 7,978,838 B2 * | 7/2011 | Rodman et al. | 379/202.01 |
| 8,004,561 B2 * | 8/2011 | Mottur et al. | 348/143 |
| 8,102,984 B2 * | 1/2012 | Rodman et al. | 379/202.01 |
| 8,300,078 B2 * | 10/2012 | Lovhaugen et al. | 348/14.03 |
| 2006/0029039 A1 * | 2/2006 | Ramey et al. | 370/352 |
| 2010/0238842 A1 * | 9/2010 | Narayanan et al. | 370/261 |
| 2011/0214153 A1 * | 9/2011 | Rosenfeld | 725/78 |
| 2012/0200662 A1 * | 8/2012 | Wu | 348/14.09 |

FOREIGN PATENT DOCUMENTS

| | | |
|---|---|---|
| CN | 101674451 A | 3/2010 |
| WO | 2007009293 A1 | 1/2007 |

* cited by examiner

METHOD AND SYSTEM FOR CONTROLLING MULTIPOINT VIDEO CONFERENCE, CENTRAL CONTROL SUBSYSTEM AND VIDEO TERMINAL

TECHNICAL FIELD

The present invention related to the field of multimedia communication, and in particular, to a method and system for controlling multipoint video conference and a central control subsystem and a video terminal.

BACKGROUND OF THE RELATED ART

At present, there are a plurality of initiation ways of the multipoint conference in the traditional multipoint video conference or in the recent multipoint telepresence conference, but it can basically be classified as two types technically; one is to transmit the conference initiation command derived from the user to the central office system at the network side through the video terminal in the conference place (which can be abbreviated as "the terminal transparent transmission" scheme); the other is to transmit the conference initiation command derived from the user to the central office system at the network side directly (which can be abbreviated as "direct transmission" scheme), not through the conference place terminal.

Since the "direct transmission" scheme has the advantages of simple and diverse developing approaches and good usability, there are relatively many implementation ways of the scheme, for example, adopting ways like WEB, mail, central control subsystem, etc. For example, the specific implementation method of adopting the central control subsystem to initiate the conference is to arrange a set of central control subsystems in the traditional video conference place or the telepresence meeting conference place, and to transmit the conference initiation command selected by the user to the central office equipment of the network side directly. Adopting the central control subsystem, the administration staff does not need to participate in the conference process of each conference, which can lower the labor intensity and save the administration cost greatly.

By contrast, in the "terminal transparent transmission" scheme, the terminal accepts the user command mostly by adopting the way of remote control, and specifically, by adopting the "terminal conference reservation/sitecall" technology, the commands originally sent by the administration staff at the network side, such as conference reservation, conference initiation and conference control and so on, are changed to be transmitted by the user at the conference place terminal side through the infrared remote control, but the remote control of the terminal device is not designed for the common personnel, thus the technology has a great restriction in the practical application. In the "terminal transparent transmission" scheme, it can also use the special terminal management background (generally adopting a PC machine equipped with the special terminal management software) to perform the control. Compared with the "direct transmission" scheme, the "terminal transparent transmission" scheme has more difficulties in development and it has a bad usability, and the administrator needs to participate in each conference and performs the operation. However, the advantage of the "terminal transparent transmission" scheme is that, in the transmission link where the conference command is transferred to the central office system, each device located before the terminal does not know the address of the central office system. So it is not necessary for the central office system to expose the address to other devices except the terminal, and the safety and the stability will not be influenced by these devices, which avoids receiving virus attack because of providing communication ports for these devices (the communication system especially emphasizes the safety and the stability of the central office system at the central part of the communication network, and once the central office system breaks down, its influence is an overall matter); in addition, for the multipoint video conference system adopting the special line, such as E1/V.35 network and so on, the communication between the central office system and the central control subsystems located in the conference place where the terminal is located can still works well without other WAN transport networks.

How to combine the advantages of such two schemes well is a technical problem to be solved in the related art.

SUMMARY OF THE INVENTION

The technical problem to be solved by the present invention is to provide a method and system for controlling multipoint video conference, a central control subsystem and a video terminal, which guarantees the good usability of the central control subsystem and also guarantees the safety and the stability of the central office system.

In order to solve the above-mentioned problem, the present invention provides a method for controlling multipoint video conference, comprising:

a central control subsystem at a conference place side transmitting a multipoint video conference control command to a video terminal;

the video terminal transmitting the received multipoint video conference control command to central office equipment at a network side; and the central office equipment controlling the video terminal of each conference place according to the received multipoint video conference control command.

Preferably, the step of the central control subsystem transmitting the multipoint video conference control command to the video terminal comprises:

a touch screen of the central control subsystem receiving the multipoint video conference control command input by a user, and notifying a central control server in the central control subsystem, and the central control server transmitting the multipoint video conference control command to the video terminal.

Preferably, the multipoint video conference control command is a multipoint video conference initiation command, a multipoint video conference ending command, an adding new conference place command, a deleting conference place command, an applying master control conference place command or a video broadcast command.

In order to solve the above-mentioned problem, the present invention further provides a system for controlling multipoint video conference, comprising a central control subsystem and a video terminal at a conference place side and central office equipment at a network side; wherein, the central control subsystem is configured to transmit a multipoint video conference control command to the video terminal;

the video terminal is configured to transmit the received multipoint video conference control command to the central office equipment at the network side; and the central office equipment is configured to control the video terminal of each conference place according to the received multipoint video conference control command.

Preferably, the central control subsystem comprises a touch screen and a central control server;

the touch screen is configured to receive the multipoint video conference control command input by a user, and notify the central control server; the central control server is configured to transmit the multipoint video conference control command to the video terminal.

Preferably, the multipoint video conference control command is a multipoint video conference initiation command, a multipoint video conference ending command, an adding new conference place command, a deleting conference place command, an applying master control conference place command or a video broadcast command.

In order to solve the above-mentioned problem, the present invention further provides a video terminal, used for controlling multipoint video conference, comprising a special interface for performing information interaction with a central control subsystem;

the video terminal is configured to receive a multipoint video conference control command from the central control subsystem through the special interface, and transmit the multipoint video conference control command to central office equipment at a network side.

Preferably, the multipoint video conference control command is a multipoint video conference initiation command, a multipoint video conference ending command, an adding new conference place command, a deleting conference place command, an applying master control conference place command or a video broadcast command.

In order to solve the above-mentioned problem, the present invention further provides a central control subsystem, used for controlling multipoint video conference, comprising a special interface for performing information interaction with a video terminal, and the central control subsystem comprises a touch screen and a central control server; wherein, the touch screen is configured to receive the multipoint video conference control command input by a user, and notify the central control server; the central control server is configured to transmit the multipoint video conference control command to the video terminal through the special interface.

Preferably, the multipoint video conference control command is a multipoint video conference initiation command, a multipoint video conference ending command, an adding new conference place command, a deleting conference place command, an applying master control conference place command or a video broadcast command.

The scheme of the present invention guarantees the good usability of the central control subsystem and also guarantees the safety and the stability of the central office system.

PREFERRED EMBODIMENTS OF THE PRESENT INVENTION

Figure 1:
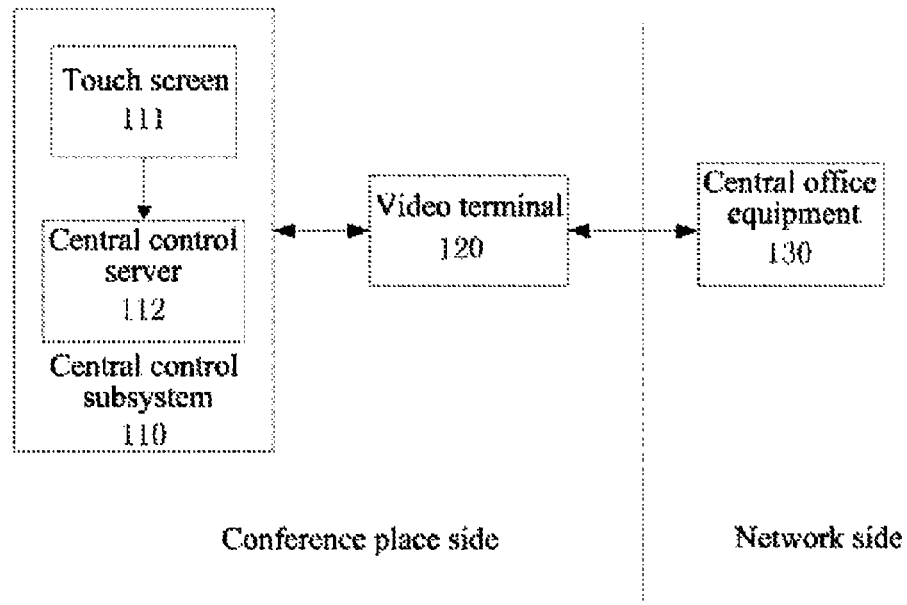
FIG. 1 is a structure diagram of a system for controlling multipoint video conference according to an embodiment of the present invention.

As shown in FIG. 1, the system for controlling multipoint video conference includes a central control subsystem 110 and a video terminal 120 at a conference place side and central office equipment 130 at a network side; the central control subsystem 110 includes a touch screen 111 and a central control server 112; the video terminal 120 and the central control subsystem 110 have special interfaces used for performing information interaction therebetween;

the central control subsystem 110 is configured to transmit a multipoint video conference control command to the video terminal 120; specifically, the touch screen 111 is configured to receive the multipoint video conference control command input by a user and notify the central control server 112; the central control server 112 is configured to transmit the multipoint video conference control command to the video terminal 120 through the special interface.

the video terminal 120 is configured to transmit the received multipoint video conference control command to the central office equipment 130 at the network side; specifically, the video terminal 120 receives the multipoint video conference control command from the central control subsystem 110 through the special interface.

The central office equipment 130 is configured to control the video terminal of each conference place according to the received multipoint video conference control command.

The above-mentioned multipoint video conference control command is a multipoint video conference initiation command, a multipoint video conference ending command, an adding new conference place command, a deleting conference place command, an applying master control conference place command or a video broadcast command.

Figure 2:
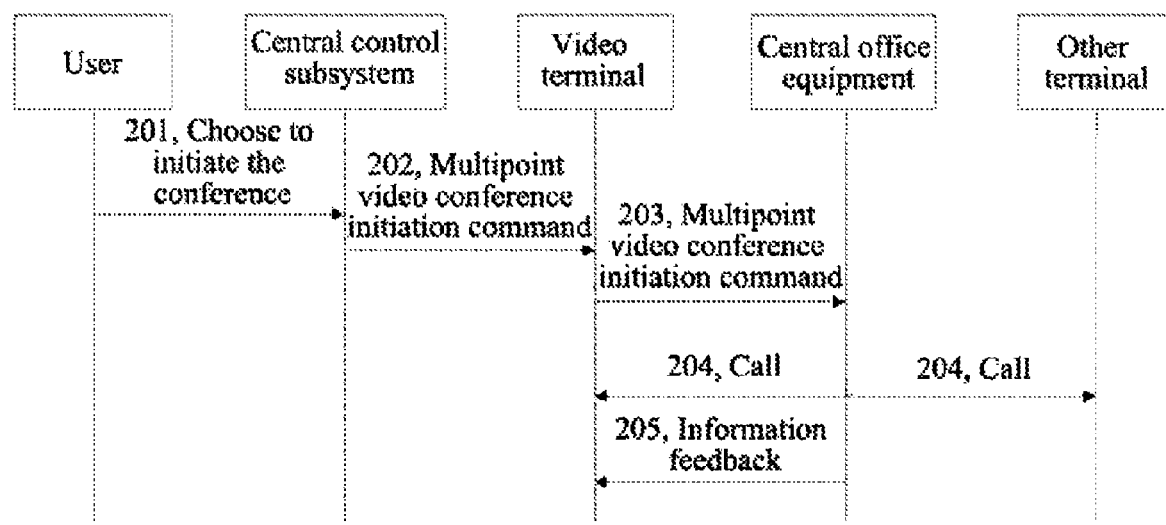
FIG. 2 is a flow chart of a method for controlling multipoint video conference according to an embodiment of the present invention.

The method for controlling multipoint video conference includes: a central control subsystem at a conference place side transmitting a multipoint video conference control command to a video terminal; the video terminal transmitting the received multipoint video conference control command to the central office equipment at a network side; and the central office equipment controlling the video terminal of each conference place according to the received multipoint video conference control command. As shown in FIG. 2, taking the multipoint video conference control command being a multipoint video conference initiation command, the method for controlling multipoint video conference includes the following steps:

in step 201, the user selects the conference participant, and clicks the "initiate the conference" button on the touch screen;

in step 202, the touch screen transmits the multipoint video conference initiation command and the carried parameter of the participant to the central control server, and the central control server transmits the multipoint video conference initiation command to the video terminal through special interface connecting with the video terminal;

the central control server transforms the multipoint video conference initiation command into a command that the video terminal can identify, such as, START <initial conference place, destination conference place>, and transmits to the video terminal through the special interface according to the format specified by the special interface customization protocol;

in step 203, the video terminal transmits the multipoint video conference initiation command to the central office equipment at the network side through the "terminal conference reservation/sitecall" interface;

in step 204, the micro controller unit (MCU) in the central office equipment calls every terminal of every conference place sequentially, including the terminal of conference place initiating the conference initiation command, and starts the conference after the call is successful;

in step 205, the central office equipment feeds back the conference information to the video terminal.

The above-mentioned procedure, besides applicable to initiating conference, is still applicable to various conference controls in the conference process, such as conference ending, adding new conference place, deleting the conference place, applying for master control conference place, video broadcast and so on, of which the control method is same with the above-mentioned method.

In the system and method of the present invention, the central control subsystem does not send the multipoint video conference control command to the central office equipment at the network side directly, but sends the multipoint video conference control command to the video terminal, and then it sends to the central office equipment at the network side through the video terminal. The way that the "direct transmission" scheme is improved as the "terminal transmission" scheme can fully utilize good usability of the central control subsystem, and it can also guarantee the safety and the stability of the central office system, and the control authority is transferred to the video terminal, which increases the conformance of the software development of the central control subsystem and thereby reduces the development complexity of the central control software.

The above description is only the preferred embodiments of the present invention and is not intended to limit the present invention. For those skilled in the art, the present invention can have various modifications and variations. All of modifications, equivalents and/or variations without departing from the spirit and essence of the present invention should be included in the protection scope of the present invention.

INDUSTRIAL APPLICABILITY

The method and system for controlling multipoint video conference, the central control subsystem and the video terminal provided by the present invention can fully utilize good usability of the central control subsystem and also can guarantee the safety and the stability of the central office system and reduce the development complexity of the central control software.

What is claimed is:

1. A method for controlling multipoint video conference, comprising:
    a central control subsystem at a conference place side directly transmitting a multipoint video conference control command to a video terminal;
    the video terminal, after directly receiving the multipoint video conference control command from the central control subsystem, directly transmitting the received multipoint video conference control command to central office equipment at a network side; and
    the central office equipment, after directly receiving the multipoint video conference control command from the video terminal, controlling the video terminal of each conference place according to the received multipoint video conference control command.

2. The method according to claim 1, wherein, the step of the central control subsystem directly transmitting the multipoint video conference control command to the video terminal comprises:
    a touch screen of the central control subsystem receiving the multipoint video conference control command input by a user, and notifying a central control server in the central control subsystem, and the central control server directly transmitting the multipoint video conference control command to the video terminal.

3. The method according to claim 1, wherein,
    the multipoint video conference control command is a multipoint video conference initiation command, a multipoint video conference ending command, an adding new conference place command, a deleting conference place command, an applying master control conference place command or a video broadcast command.

4. The method according to claim 2, wherein,
    the multipoint video conference control command is a multipoint video conference initiation command, a multipoint video conference ending command, an adding new conference place command, a deleting conference place command, an applying master control conference place command or a video broadcast command.

5. The method according to claim 1, wherein the multipoint video conference command carries a parameter of a participant participating the conference.

6. A system for controlling multipoint video conference, comprising a central control subsystem and a video terminal at a conference place side and central office equipment at a network side; wherein,
    the central control subsystem is configured to directly transmit a multipoint video conference control command to the video terminal;
    the video terminal is configured to directly receive the multipoint video conference control command from the central control subsystem, and directly transmit the received multipoint video conference control command to the central office equipment at the network side; and
    the central office equipment is configured to directly receive the multipoint video conference control command from the video terminal, and control the video terminal of each conference place according to the received multipoint video conference control command.

7. The system according to claim 6, wherein,
    the central control subsystem comprises a touch screen and a central control server;
    the touch screen is configured to receive the multipoint video conference control command input by a user, and notify the central control server;
    the central control server is configured to directly transmit the multipoint video conference control command to the video terminal.

8. The system according to claim 6, wherein,
    the multipoint video conference control command is a multipoint video conference initiation command, a multipoint video conference ending command, an adding new conference place command, a deleting conference place command, an applying master control conference place command or a video broadcast command.

9. The system according to claim 7, wherein,
    the multipoint video conference control command is a multipoint video conference initiation command, a multipoint video conference ending command, an adding new conference place command, a deleting conference place command, an applying master control conference place command or a video broadcast command.

10. The system according to claim 6, wherein the multipoint video conference command carries a parameter of a participant participating the conference.

11. A video terminal, used for controlling multipoint video conference, characterized in that the video terminal comprises a special interface for performing information interaction with a central control subsystem; and the video terminal is configured to directly receive a multipoint video conference control command from the central control subsystem through the special interface, and directly transmit the multipoint video conference control command to central office equipment at a network side.

12. The video terminal according to claim 11, wherein, the multipoint video conference control command is a multipoint video conference initiation command, a multipoint video conference ending command, an adding new conference place command, a deleting conference place command, an applying master control conference place command or a video broadcast command.

13. The video terminal according to claim 11, wherein the multipoint video conference command carries a parameter of a participant participating the conference.

14. A central control subsystem, used for controlling multipoint video conference, characterized in that the central control subsystem comprises a special interface for performing information interaction with a video terminal, and the central control subsystem comprises a touch screen and a central control server, wherein,
the touch screen is configured to receive a multipoint video conference control command input by a user, and notify the central control server; and
the central control server is configured to directly transmit the multipoint video conference control command to the video terminal through the special interface,
wherein the multipoint video conference command carries a parameter of a participant participating the conference.

15. The central control subsystem according to claim 14, wherein,
the multipoint video conference control command is a multipoint video conference initiation command, a multipoint video conference ending command, an adding new conference place command, a deleting conference place command, an applying master control conference place command or a video broadcast command.

* * * * *